United States Patent
Merlin et al.

(10) Patent No.: US 9,730,246 B2
(45) Date of Patent: *Aug. 8, 2017

(54) COLLISION REDUCTION MECHANISMS FOR WIRELESS COMMUNICATION NETWORKS

(71) Applicant: QUALCOMM Incorporated, San Diego, CA (US)

(72) Inventors: Simone Merlin, Solana Beach, CA (US); Mohammad Hossein Taghavi Nasrabadi, Sunnyvale, CA (US); Maarten Menzo Wentink, Naarden (NL)

(73) Assignee: QUALCOMM Incorporated, San Diego, CA (US)

( * ) Notice: Subject to any disclaimer, the term of this patent is extended or adjusted under 35 U.S.C. 154(b) by 97 days.

This patent is subject to a terminal disclaimer.

(21) Appl. No.: 14/531,346

(22) Filed: Nov. 3, 2014

(65) Prior Publication Data

US 2015/0049730 A1     Feb. 19, 2015

Related U.S. Application Data

(63) Continuation of application No. 13/557,458, filed on Jul. 25, 2012, now Pat. No. 8,917,705.

(Continued)

(51) Int. Cl.
H04W 74/08     (2009.01)
H04W 74/00     (2009.01)
H04W 74/02     (2009.01)

(52) U.S. Cl.
CPC ..... *H04W 74/0816* (2013.01); *H04W 74/002* (2013.01); *H04W 74/006* (2013.01); *H04W 74/02* (2013.01)

(58) Field of Classification Search
CPC .......... H04W 74/0816; H04W 74/002; H04W 74/005; H04W 74/02
See application file for complete search history.

(56) References Cited

U.S. PATENT DOCUMENTS 6,438,375 B1   8/2002   Muller
7,095,754 B2   8/2006   Benveniste
(Continued)

FOREIGN PATENT DOCUMENTS

EP   0917317 A1   5/1999
EP   1962460 A2   8/2008
(Continued)

OTHER PUBLICATIONS

Garg, Parag. "Distributed Medium Reservation Scheme for Wireless Sensor Networks," Dept. of Electrical Engineering, UCLA, Oct. 2009.

(Continued)

*Primary Examiner* — Duc C Ho
(74) *Attorney, Agent, or Firm* — QUALCOMM Incorporated

(57) ABSTRACT

A method includes wirelessly communicating with one or more stations that are partitioned into one or more groups. The method also includes generating a message that identifies one or more time periods during which each station of a first group of the one or more groups is permitted to contend for a communication channel or restricted from contending for the communication channel. The method further includes transmitting the message.

48 Claims, 9 Drawing Sheets

Related U.S. Application Data

(60) Provisional application No. 61/540,681, filed on Sep. 29, 2011.

(56) References Cited

U.S. PATENT DOCUMENTS

| | | | |
|---|---|---|---|
| 7,890,116 | B2 | 2/2011 | Salokannel et al. |
| 2006/0171341 | A1 | 8/2006 | Wang et al. |
| 2007/0248072 | A1 | 10/2007 | Kwon et al. |
| 2008/0095163 | A1 | 4/2008 | Chen et al. |
| 2008/0198815 | A1* | 8/2008 | Liu .................. H04W 74/0816 370/336 |
| 2009/0010191 | A1 | 1/2009 | Wentink |
| 2009/0010276 | A1* | 1/2009 | Yonge, III .......... H04L 12/2801 370/447 |
| 2009/0323611 | A1 | 12/2009 | Singh et al. |
| 2010/0014423 | A1* | 1/2010 | Furuskar ............... H04W 74/02 370/235 |
| 2010/0054145 | A1 | 3/2010 | Frenger et al. |
| 2010/0165963 | A1 | 7/2010 | Chu et al. |
| 2010/0182962 | A1* | 7/2010 | Cheng ................. H04W 74/002 370/329 |
| 2010/0208660 | A1 | 8/2010 | Ji |
| 2012/0263094 | A1 | 10/2012 | Wentink |
| 2013/0010731 | A1 | 1/2013 | Diener et al. |
| 2013/0195081 | A1 | 8/2013 | Merlin et al. |

FOREIGN PATENT DOCUMENTS

| | | |
|---|---|---|
| EP | 2209346 A2 | 7/2010 |
| JP | 2006197483 A | 7/2006 |
| WO | WO-2010081895 A1 | 7/2010 |

OTHER PUBLICATIONS

International Search Report and Written Opinion—PCT/US2012/058325—ISA/EPO—Dec. 19, 2012.

* cited by examiner

COLLISION REDUCTION MECHANISMS FOR WIRELESS COMMUNICATION NETWORKS

CROSS REFERENCE TO RELATED APPLICATIONS

Claim of Priority Under 35 U.S.C. §120

The present Application for Patent is a continuation of patent application Ser. No. 13/557,458, entitled "COLLISION REDUCTION MECHANISMS FOR WIRELESS COMMUNICATION NETWORKS," filed Jul. 25, 2012, pending, which claims priority to Provisional Application No. 61/540,681 entitled "COLLISION REDUCTION MECHANISMS FOR WIRELESS COMMUNICATION NETWORKS" filed Sep. 29, 2011, and assigned to the assignee hereof and hereby expressly incorporated by reference herein.

FIELD OF THE DISCLOSURE

The present disclosure relates generally to wireless communications, and more specifically to systems, methods, and devices for reducing collisions in 802.11 wireless networks with large numbers of stations.

BACKGROUND

In many telecommunication systems, communications networks are used to exchange messages among several interacting spatially-separated devices. Networks may be classified according to geographic scope, which could be, for example, a metropolitan area, a local area, or a personal area. Such networks would be designated respectively as a wide area network (WAN), metropolitan area network (MAN), local area network (LAN), or personal area network (PAN). Networks also differ according to the switching/routing technique used to interconnect the various network nodes and devices (e.g. circuit switching vs. packet switching), the type of physical media employed for transmission (e.g. wired vs. wireless), and the set of communication protocols used (e.g. Internet protocol suite, SONET (Synchronous Optical Networking), Ethernet, etc.).

Wireless networks are often preferred when the network elements are mobile and thus have dynamic connectivity needs, or if the network architecture is formed in an ad hoc, rather than fixed, topology. Wireless networks employ intangible physical media in an unguided propagation mode using electromagnetic waves in the radio, microwave, infra-red, optical, etc. frequency bands. Wireless networks advantageously facilitate user mobility and rapid field deployment when compared to fixed wired networks.

The devices in a wireless network may transmit/receive information between each other. The information may comprise packets, which in some aspects may be referred to as data units. The packets may include overhead information (e.g., header information, packet properties, etc.) that helps in routing the packet through the network, identifying the data in the packet, processing the packet, etc., as well as data, for example user data, multimedia content, etc. as might be carried in a payload of the packet.

Devices participating in a Carrier Sense Multiple Access (CSMA) wireless network must contend with each other for use of the medium (e.g. the radio frequency carrier) to transmit data, such as packets. While methods exist to allow multiple devices to access a shared medium without data loss, devices which sense the medium and determine that the medium is not available (collide) use power and system resources without providing productive communication.

SUMMARY

The systems, methods, and devices of the disclosure each have several aspects, no single one of which is solely responsible for its desirable attributes. Without limiting the scope of this disclosure as expressed by the claims which follow, some features will now be described briefly. After considering this discussion, and particularly after reading the section entitled "Detailed Description" one will understand how the features of this disclosure provide advantages that include reducing failed attempts at channel acquisition.

In a particular embodiment, a device includes a transmitter configured to wirelessly communicate with one or more stations that are partitioned into one or more groups. The device also includes a processor configured to generate a message that identifies one or more time periods during which each station of a first group of the one or more groups is permitted to contend for a communication channel or restricted from contending for the communication channel and to instruct the transmitter to transmit the first message.

In another particular embodiment, a method includes wirelessly communicating with one or more stations that are partitioned into one or more groups. The method also includes generating a message that identifies one or more time periods during which each station of a first group of the one or more groups is permitted to contend for a communication channel or restricted from contending for the communication channel. The method further includes transmitting the message.

In another particular embodiment, a device includes a transmitter configured to contend for a communication channel. The device also includes a receiver configured to receive a message that identifies one or more time periods during which each station of a first group of stations is permitted to contend for the communication channel or restricted from contending for the communication channel. The device further includes a processor configured to determine whether the transmitter is permitted to contend for the communication channel or restricted from contending for the communication channel during the one or more time periods based on whether the device is a member of the first group.

In another particular embodiment, a method includes receiving a message that identifies one or more time periods during which each station of a first group of stations is permitted to contend for a communication channel or restricted from contending for the communication channel. The method also includes determining whether a particular station is permitted to contend for the communication channel or restricted from contending for the communication channel during the one or more time periods based on whether the particular station is a member of the first group.

DETAILED DESCRIPTION

Figure 1:
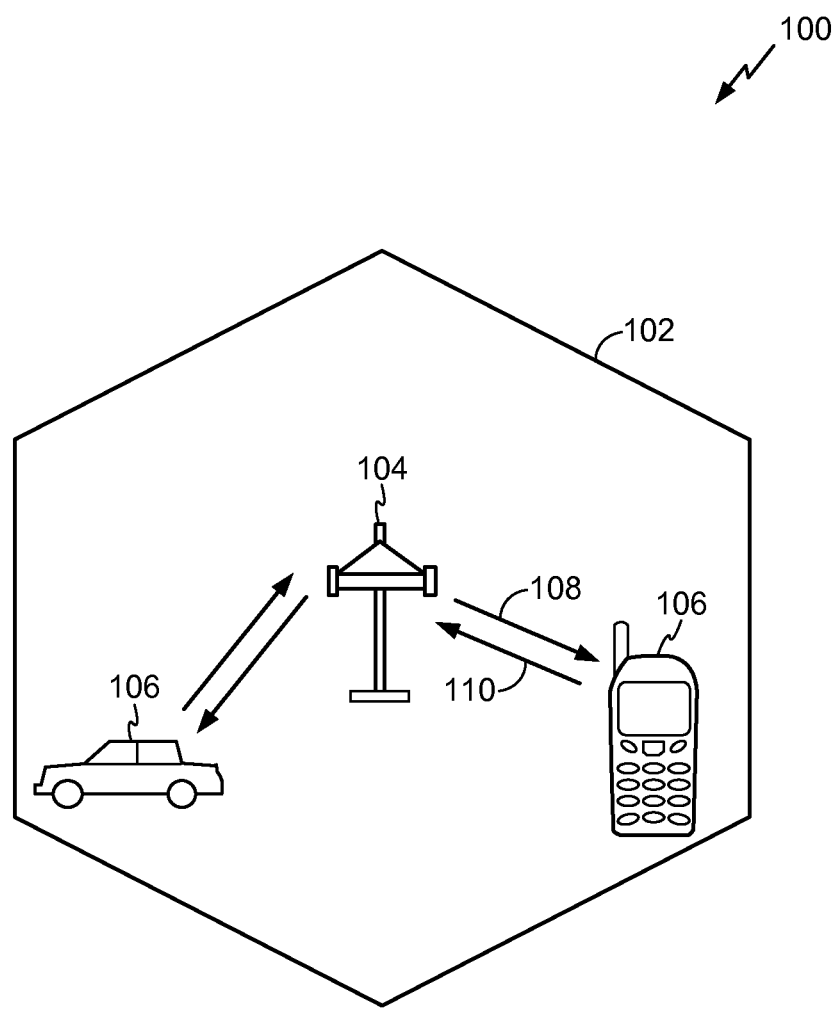
FIG. 1 illustrates an example of a wireless communication system in which aspects of the present disclosure may be employed.

Various aspects of the novel systems, apparatuses, and methods are described more fully hereinafter with reference to the accompanying drawings. The teachings in this disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of or combined with any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Popular wireless network technologies may include various types of wireless local area networks (WLANs). A WLAN may be used to interconnect nearby devices together, employing widely used networking protocols. The various aspects described herein may apply to any communication standard, such as WiFi or, more generally, any member of the IEEE 802.11 family of wireless protocols. For example, the various aspects described herein may be used as part of the IEEE 802.11ah protocol, which uses sub-1 GHz bands.

In some aspects, wireless signals in a sub-gigahertz band may be transmitted according to the 802.11ah protocol using orthogonal frequency-division multiplexing (OFDM), direct-sequence spread spectrum (DSSS) communications, a combination of OFDM and DSSS communications, or other schemes. Implementations of the 802.11ah protocol may be used for sensors, metering, and smart grid networks. Advantageously, aspects of certain devices implementing the 802.11ah protocol may consume less power than devices implementing other wireless protocols, and/or may be used to transmit wireless signals across a relatively long range, for example about one kilometer or longer.

In some implementations, a WLAN includes various devices which are the components that access the wireless network. For example, there may be two types of devices: access points ("APs") and clients (also referred to as stations, or "STAs"). In general, an AP serves as a hub or base station for the WLAN and an STA serves as a user of the WLAN. For example, an STA may be a laptop computer, a personal digital assistant (PDA), a mobile phone, etc. In an example, an STA connects to an AP via a WiFi (e.g., IEEE 802.11 protocol such as 802.11ah, which is in development) compliant wireless link to obtain general connectivity to the Internet or to other wide area networks. In some implementations an STA may also be used as an AP.

An access point ("AP") may also comprise, be implemented as, or known as a NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, or some other terminology.

A station "STA" may also comprise, be implemented as, or known as an access terminal ("AT"), a subscriber station, a subscriber unit, a mobile station, a remote station, a remote terminal, a user terminal, a user agent, a user device, user equipment, or some other terminology. In some implementations an access terminal may comprise a cellular telephone, a cordless telephone, a Session Initiation Protocol ("SIP") phone, a wireless local loop ("WLL") station, a personal digital assistant ("PDA"), a handheld device having wireless connection capability, or some other suitable processing device connected to a wireless modem. Accordingly, one or more aspects taught herein may be incorporated into a phone (e.g., a cellular phone or smartphone), a computer (e.g., a laptop), a portable communication device, a headset, a portable computing device (e.g., a personal data assistant), an entertainment device (e.g., a music or video device, or a satellite radio), a gaming device or system, a global positioning system device, or any other suitable device that is configured to communicate via a wireless medium.

APs and stations may be referred to generally as transmitting or receiving nodes in a wireless communication network.

As described above, certain of the devices described herein may be implemented in the 802.11ah standard, for example. Such devices, whether used as an STA or AP or other device, may be used for smart metering or in a smart grid network. Such devices may provide sensor applications or be used in home automation. The devices may instead or in addition be used in a healthcare context, for example for personal healthcare. They may also be used for surveillance, to enable extended-range Internet connectivity (e.g. for use with hotspots), or to implement machine-to-machine communications.

Wireless nodes, such as stations and APs, may interact in a Carrier Sense Multiple Access (CSMA) type network, such as a network that conforms to the 802.11ah standard.

CSMA is a probabilistic Media Access Control (MAC) protocol. "Carrier Sense" describes the fact that a node attempting to transmit on a medium may use feedback from its receiver to detect a carrier wave before trying to send its own transmission. "Multiple Access" describes the fact that multiple nodes may send and receive on a shared medium. Accordingly, in a CSMA type network, a transmitting node senses the medium and if the medium is busy (i.e. another node is transmitting on the medium), the transmitting node will defer its transmission to a later time. If, however, the medium is sensed as free, then the transmitting node may transmit its data on the medium.

Clear Channel Assessment (CCA) is used to determine the state of the medium before a node attempts to transmit thereon. The CCA procedure is executed while a node's receiver is turned on and the node is not currently transmitting a data unit such as a packet. A node may sense whether the medium is clear by, for example, detecting the start of a packet by detecting the packet's PHY preamble. This method may detect relatively weaker signals. Accordingly, there is a low detection threshold with this method. An alternative method is to detect some energy on the air, which may be referred to as energy detection (ED). This method is relatively more difficult than detecting the start of a packet and may only detect relatively stronger signals. As such, there is higher detection threshold with this method. In general, detection of another transmission on the medium is a function of the received power of the transmission, where the received power is the transmitted power minus the path loss.

While CSMA is particularly effective for mediums that are not heavily used, performance degradation may occur where the medium becomes crowded with many devices trying to access it simultaneously. When multiple transmitting nodes try to use the medium at once, collisions between the simultaneous transmissions may occur and transmitted data may be lost or corrupted. Because with wireless data communications it is generally not possible to listen to the medium while transmitting on it, collision detection is not possible. Further, transmissions by one node are generally only received by other nodes using the medium that are in range of the transmitting node. This is known as the hidden node problem, whereby, for example, a first node wishing to transmit to and in range of a receiving node, is not in range of a second node that is currently transmitting to the receiving node, and therefore the first node cannot know that the second node is transmitting to the receiving node and thus occupying the medium. In such a situation, the first node may sense that the medium is free and begin to transmit, which may then cause a collision and lost data at the receiving node. Accordingly, collision avoidance schemes are used to improve the performance of CSMA by attempting to divide access to the medium up somewhat equally among all transmitting nodes within a collision domain. Notably, collision avoidance differs from collision detection due to the nature of the medium, in this case the radio frequency spectrum.

In a CSMA network utilizing collision avoidance (CA), a node wishing to transmit first senses the medium and if the medium is busy then it defers (i.e. does not transmit) for a period of time. The period of deferral is followed by a randomized backoff period i.e. an additional period of time in which the node wishing to transmit will not attempt to access the medium. The backoff period is used to resolve contention between different nodes trying to access a medium at the same time. The backoff period may also be referred to as a contention window. Backoff requires each node trying to access a medium to choose a random number in a range and wait for the chosen number of time slots before trying to access the medium, and to check whether a different node has accessed the medium before. The slot time is defined in such a way that a node will always be capable of determining if another node has accessed the medium at the beginning of the previous slot. In particular, the 802.11 standard uses an exponential backoff algorithm wherein each time a node chooses a slot and collides with another node, it will increase the maximum number of the range exponentially. If, on the other hand, a node wishing to transmit senses the medium as free for a specified time (called the Distributed Inter Frame Space (DIFS) in the 802.11 standard), then the node is allowed to transmit on the medium. After transmitting, the receiving node will perform a cyclic redundancy check (CRC) of the received data and send an acknowledgement back to the transmitting node. Receipt of the acknowledgment by the transmitting node will indicate to the transmitting node that no collision has occurred. Similarly, no receipt of an acknowledgment at the transmitting node will indicate that a collision has occurred and that the transmitting node should resend the data.

FIG. 1 illustrates an example of a wireless communication system 100 in which aspects of the present disclosure may be employed. The wireless communication system 100 may operate pursuant to a wireless standard, for example the 802.11ah standard. The wireless communication system 100 may include an AP 104, which communicates with STAs 106.

A variety of processes and methods may be used for transmissions in the wireless communication system 100 between the AP 104 and the STAs 106. For example, signals may be sent and received between the AP 104 and the STAs 106 in accordance with OFDM/OFDMA techniques. If this is the case, the wireless communication system 100 may be referred to as an OFDM/OFDMA system. Alternatively, signals may be sent and received between the AP 104 and the STAs 106 in accordance with CDMA techniques. If this is the case, the wireless communication system 100 may be referred to as a CDMA system.

A communication link that facilitates transmission from the AP 104 to one or more of the STAs 106 may be referred to as a downlink (DL) 108, and a communication link that facilitates transmission from one or more of the STAs 106 to the AP 104 may be referred to as an uplink (UL) 110. Alternatively, a downlink 108 may be referred to as a forward link or a forward channel, and an uplink 110 may be referred to as a reverse link or a reverse channel.

The AP 104 may act as a base station and provide wireless communication coverage in a basic service area (BSA) 102. The AP 104 along with the STAs 106 associated with the AP 104 and that use the AP 104 for communication may be referred to as a basic service set (BSS). It should be noted that the wireless communication system 100 may not have a central AP 104, but rather may function as a peer-to-peer or ad-hoc network between the STAs 106. Accordingly, the functions of the AP 104 described herein may alternatively be performed by one or more of the STAs 106.

Figure 2:
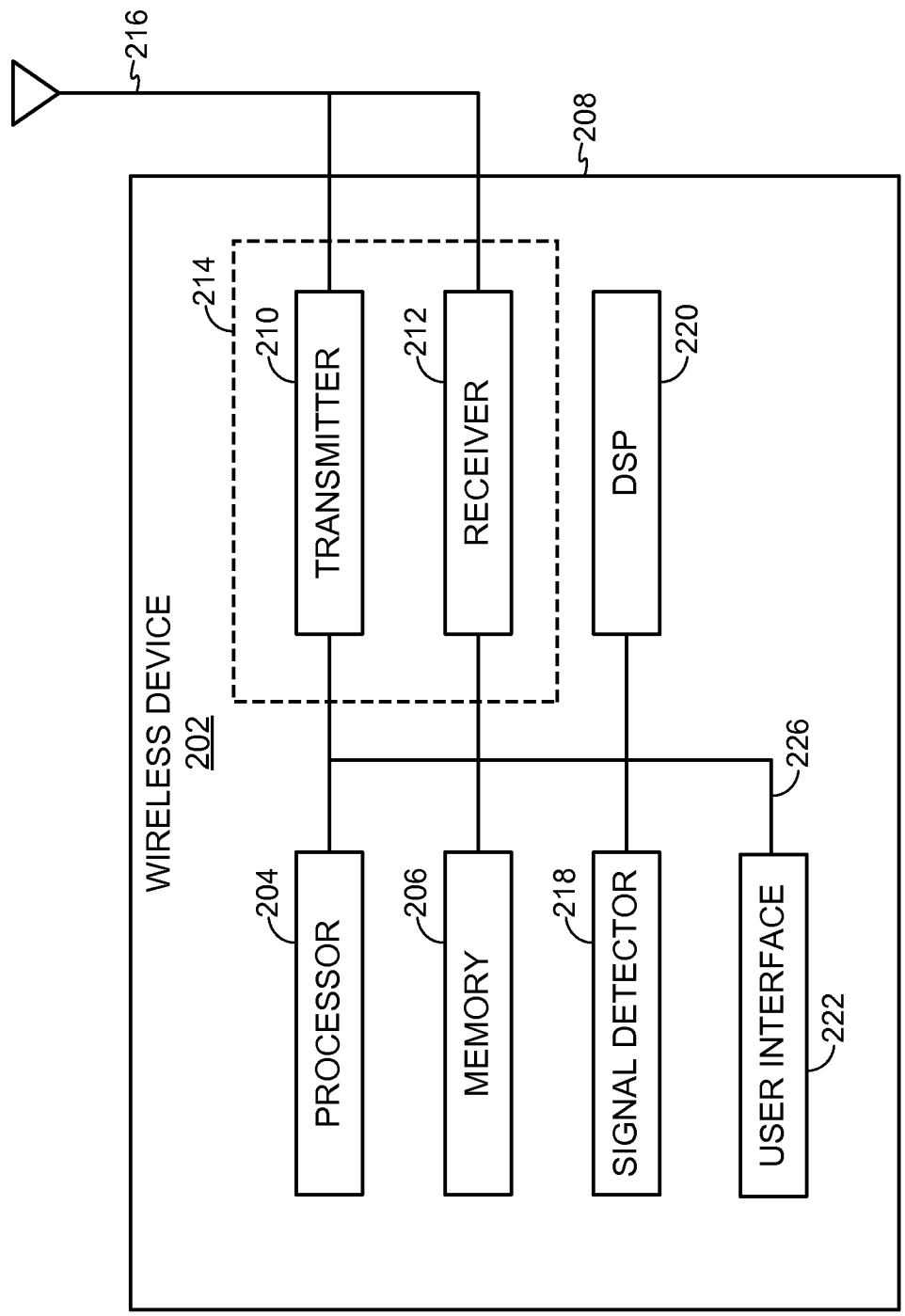
FIG. 2 illustrates various components, including a receiver that may be utilized in a wireless device that may be employed within the wireless communication system of FIG. 1.

FIG. 2 illustrates various components that may be utilized in a wireless device 202 that may be employed within the wireless communication system 100. The wireless device 202 is an example of a device that may be configured to implement the various methods described herein. For example, the wireless device 202 may comprise the AP 104 or one of the STAs 106.

The wireless device 202 may include a processor 204 which controls operation of the wireless device 202. The processor 204 may also be referred to as a central processing unit (CPU). Memory 206, which may include both read-only memory (ROM) and random access memory (RAM), provides instructions and data to the processor 204. A portion of the memory 206 may also include non-volatile random access memory (NVRAM). The processor 204 typically performs logical and arithmetic operations based on program instructions stored within the memory 206. The instructions in the memory 206 may be executable to implement the methods described herein.

The processor 204 may comprise or be a component of a processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

The wireless device 202 may also include a housing 208 that may include a transmitter 210 and a receiver 212 to allow transmission and reception of data between the wireless device 202 and a remote location. The transmitter 210 and receiver 212 may be combined into a transceiver 214. An antenna 216 may be attached to the housing 208 and electrically coupled to the transceiver 214. The wireless device 202 may also include (not shown) multiple transmitters, multiple receivers, multiple transceivers, and/or multiple antennas.

The wireless device 202 may also include a signal detector 218 that may be used in an effort to detect and quantify the level of signals received by the transceiver 214. The signal detector 218 may detect such signals as total energy, energy per subcarrier per symbol, power spectral density and other signals. The wireless device 202 may also include a digital signal processor (DSP) 220 for use in processing signals. The DSP 220 may be configured to generate a data unit for transmission. In some aspects, the data unit may comprise a physical layer data unit (PPDU). In some aspects, the PPDU is referred to as a packet.

The wireless device 202 may further include a user interface 222 in some aspects. The user interface 222 may include a keypad, a microphone, a speaker, and/or a display. The user interface 222 may include any element or component that conveys information to a user of the wireless device 202 and/or receives input from the user.

The various components of the wireless device 202 may be coupled together by a bus system 226. The bus system 226 may include a data bus, for example, as well as a power bus, a control signal bus, and a status signal bus in addition to the data bus. Those of skill in the art will appreciate the components of the wireless device 202 may be coupled together or accept or provide inputs to each other using some other mechanism.

Although a number of separate components are illustrated in FIG. 2, those of skill in the art will recognize that one or more of the components may be combined or commonly implemented. For example, the processor 204 may be used to implement not only the functionality described above with respect to the processor 204, but also to implement the functionality described above with respect to the signal detector 218 and/or the DSP 220. Further, each of the components illustrated in FIG. 2 may be implemented using a plurality of separate elements.

As described above, the wireless device 202 may comprise an AP 104 or an STA 106, and may be used to transmit and/or receive communications.

Figure 3:
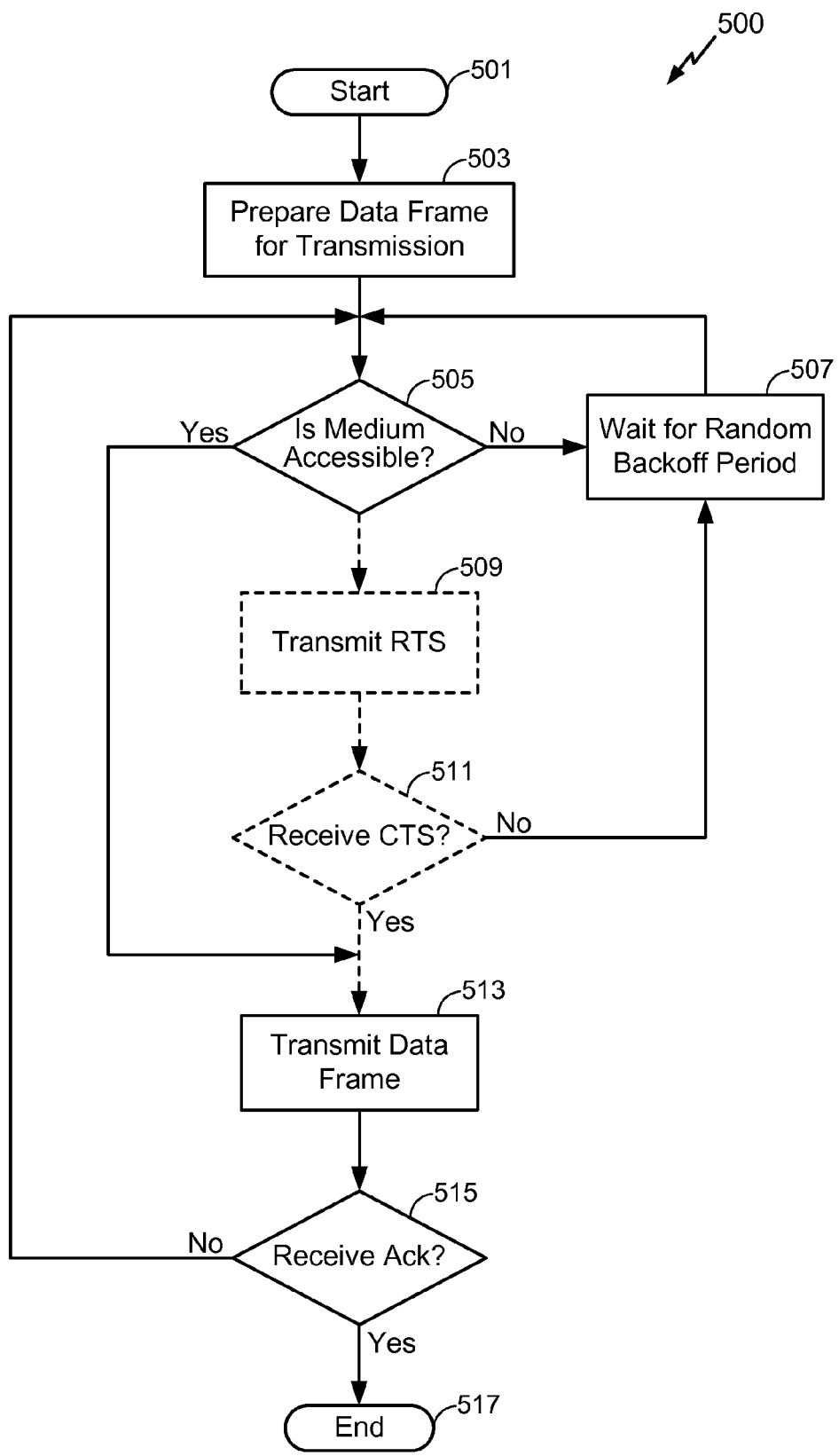
FIG. 3 illustrates an aspect of a process whereby a wireless node attempts transmission in a standard CSMA network with collision avoidance.

FIG. 3 illustrates an aspect of a process 500 whereby a wireless node attempts transmission in a standard CSMA network with collision avoidance. The process 500 starts at block 501 and moves to block 503 where a wireless node prepares a data frame for transmission on a medium. At block 505 the wireless node runs a CCA algorithm to detect whether the medium is accessible for transmission. As described previously, the CCA algorithm may be based on, for example, detecting the start of a packet by detecting the packet's PHY preamble, or by detecting some energy on the air.

If the network uses virtual carrier sense, then the wireless node transmits an RTS frame to a receiving node at block 509. If at block 511 the wireless node receives a CTS frame from the receiving node, then the process 500 moves to block 513 where the wireless node transmits the data frame using the medium. If, however, at block 511 the wireless node does not receive a CTS frame, it moves to block 507 where it waits for a random backoff period before sensing the medium again at block 505.

If the network does not use virtual carrier sense, then at block 505, if after running the CCA algorithm the medium is not accessible, then the process 500 moves to block 507 where it waits for a random backoff period before sensing the medium again at block 505. If, on the other hand, at block 505 the medium is sensed to be accessible (e.g. the medium is idle for a DIFS period), then the process 500 moves to block 513 where the wireless node transmits the data frame using the medium.

After transmitting the data frame at block 513, in networks using virtual carrier sense or not using virtual carrier sense, the process 500 moves to block 515 where the wireless node waits for an acknowledgement from the receiving node that the data frame has been received. If at block 515, the wireless node does not receive an acknowledgement, then the process 500 moves back to block 505 and the wireless node attempts to transmit the data frame again. If, however, at block an acknowledgement is received by the wireless node, then the process 500 moves to block 517 and ends.

Notably, blocks 505 and 507, and optionally 509 and 511, implement the collision management aspect of the illustrated process 500. If at block 505, after running the CCA algorithm the medium is not accessible, then the process 500 moves to block 507 where it waits for a random backoff period before sensing the medium again at block 505. Similarly, if at block 511 the wireless node does not receive a CTS frame, it moves to block 507 where it waits for a random backoff period before sensing the medium again at block 505. Because devices which sense the medium and determine that the medium is not available use power and system resources without providing productive communication, avoiding such collisions is advantageous.

As noted above collisions occur when multiple devices contend for the medium at the same time. As the number of devices contending for the medium goes up, the number of unsuccessful attempts to acquire the medium also goes up. Likewise, fewer contending devices results in fewer collisions. A time allotment scheme for reducing the number of devices contending for the medium at a given time may be used, and results in fewer collisions. Stations potentially contending for the medium are grouped and time slots are allotted to the groups. Accordingly, each group has a time period during which the stations of the group are permitted to contend for the medium, and during each time period, only a portion of the stations are permitted to contend for the medium. As a result, the stations contend for the medium with a lower probability of collision.

Figure 4:
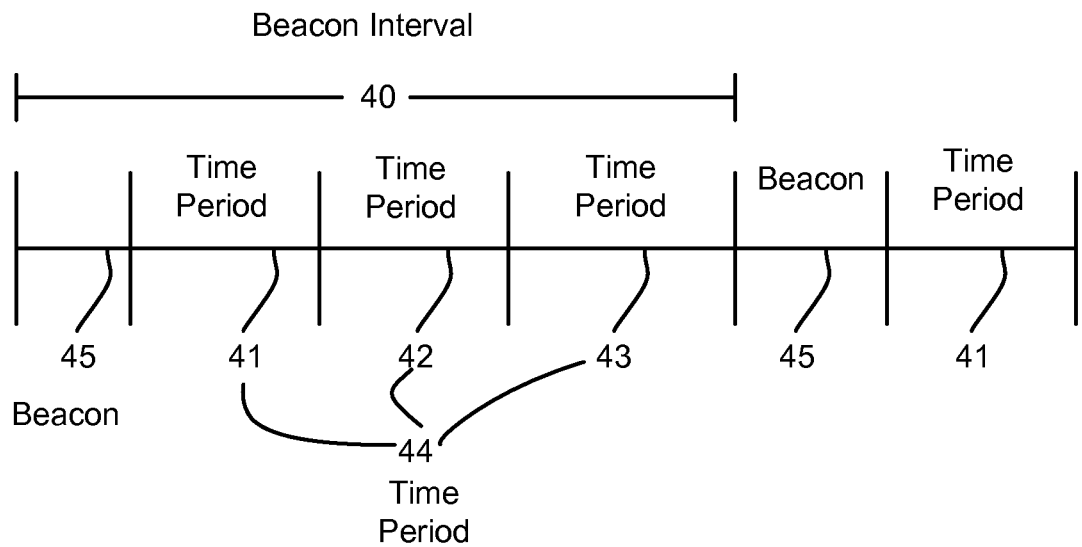
FIG. 4 illustrates an example beacon interval with time periods.

FIG. 4 illustrates a beacon interval 40 (e.g., a single beacon period) with time periods 44. While the figures and description reference time periods as being portions of beacon intervals, in some implementations, the time periods are independent of beacon intervals. As an example, the time periods may be indicated by trigger frames that solicit uplink contention by a specific group of stations. As shown in FIG. 4, beacon interval 40 begins with a beacon 45. Following beacon 45 are time periods 41, 42, and 43. In some implementations, the time periods 41, 42, and 43 may have substantially identical durations. Alternatively, the time periods 41, 42, and 43 may have durations which are not identical.

Figure 5:
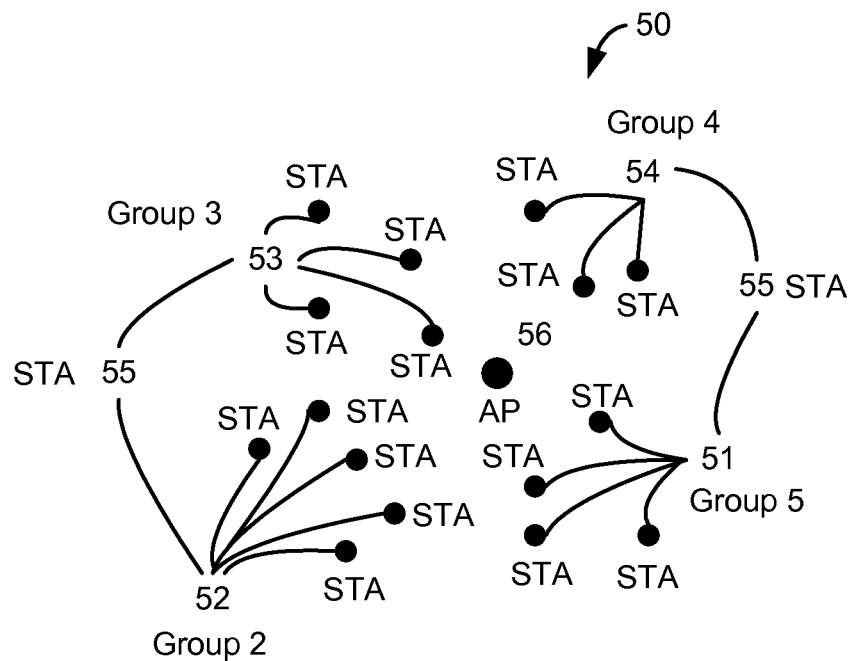
FIG. 5 illustrates an example of a network of wireless communication devices.

FIG. 5 illustrates a network 50 of wireless communication devices. The wireless communication devices include AP 56, which may be similar to AP 104, and a plurality of STAs 55, which may each be similar to the STAs 106a, 106b, 106c, and 106d. Each STA 55 is a member of one or more groups of one or more STAs 55. STAs 51 are each members of Group 1, STAs 52 are each members of Group 2, STAs 53 are each members of Group 3, and STAs 54 are each members of Group 4.

In some implementations one or more STAs 55 are members of multiple groups. In some aspects, the STAs 55 may be assigned to one or more groups during initialization of each STA 55 (e.g., at the time of manufacture of the STA 55, at the first run time of the STA 55, when an STA 55 joins a new wireless network such as wireless communication system 50 through association/reassociation responses, etc.). The group assignments for the STAs 55 may be assigned/updated through periodic beacon frames or management frames. In some aspects, the groups may be assigned or additionally revised, such as through communication with other devices in the wireless communication system 50, such as the AP 56. In some aspects, the AP 56 may determine or assign groups for the STAs 55 and transmit messages indicative of the group assignments to the STAs 55. The groups may be disjoint or overlapping, meaning that in certain aspects a plurality of the groups may include the same STAs 55, and in certain aspects one group may include a STA 55 that another group does not include. Further, the groups may be of the same or different sizes, meaning they contain the same or different numbers of STAs 55. Further, some groups may include a continuous interval of STAs 55, such as a sequential series of STAs 55, according to an identification number, such as an association identification (AID). Some groups may include STAs 55 that do not form a continuous interval. In one aspect, a group may include the entire set of STAs 55. Such a group may be referred to as a broadcast group. Each STA 55 may be assigned or given information to identify the groups the STA 55 is a member of (e.g., based on a corresponding identification number of each STA 55).

In some implementations, the groups are defined based on a common characteristic of the members of the group. For example, groups may be defined based on one or more of a common or similar class of traffic, a common or similar volume of traffic, a common or similar geographical location, a common or similar AID, and common or similar hardware capabilities of the STAs. The hardware capabilities may include maximum transmit power, power source (battery, grid), or support for data transmit and receive capabilities (e.g., specific data rates, modulation and coding techniques, number of spatial streams). The geographical location may include a relative location with respect to other STAs in the network and whether the STAs are hidden from each other or not.

In some implementations, the group assignments may be based on a particular class of traffic. The particular class of traffic may include one or more particular types of traffic. A type of traffic may include voice traffic, video traffic, best effort traffic, background traffic, emergency traffic, or a combination thereof. Each STA 55 in a given group may access the medium (e.g., a communication channel) in a given interval of time to send one or more types of traffic in the particular class when the group is based on the particular class of traffic, but may not be allowed to send traffic of other types that belong to a different class (but do not belong in the particular class).

In some implementations, the group assignments may be based on contention parameters that a STA 55 is allowed to use to send the traffic (i.e., a STA 55 in a given group may be allowed to access the medium with a given set of contention parameters in a given interval of time to send traffic of one or more types, but may not be allowed to send traffic using different contention parameters). The contention parameters may include Arbitration Interframe Space (AIFS), Contention Window minimum (CWmin), contention window maximum (CWmax), or backoff value. In some implementations, the group assignments are made by a coordinating device, such as the AP 56.

Referring again to FIG. 4, as part of the beacon 45, the AP 56 may transmit messages to the STAs 55 to indicate to each of the STAs 55 during which time periods 44 each STA 55 is restricted from contending for the communication channel. For example, Group 1 may be restricted from contending for the communication channel during time periods 41 and 42, Group 2 may be restricted from contending for the communication channel during time periods 42 and 43, Group 3 may be restricted from contending for the communication channel during time periods 41 and 43, and Group 4 may be restricted from contending for the communication channel during time period 41. The STAs 55 may be configured to determine to which group they belong according to one or more of an association setup, an indication in a beacon or in a paging frame, a direct message to the STA 55. In some implementations, the STA 55 or a group of STAs 55 may be configured to read beacons at specific target beacon transmission times (TBTTs) to determine if the STA 55 belongs to a group and to determine the related allowed contention intervals. In some implementations, a group of STAs 55 may be determined by an implicit function of an identification of the STA 55, an implicit function of the class of traffic that the STA 55 is to send, an implicit function of the hardware characteristics, an implicit function of the contention parameters, or a combination thereof.

In some implementations, the characteristics of the interval for contention may be indicated in an association setup, an indication in a beacon, a paging frame, a direct message to the STA 55, or a combination thereof. In one example, a start of the contention period may be indicated in terms of a period (e.g. every 5 μs, every 10 μs, etc.) and a start time (i.e. every time period (e.g., 5 µs, 10 µs, etc.) starting from a particular time or event (e.g. the time of reception of the message or an offset with respect to the TBTT)). In one example, the start of the contention period for a STA 55 or for a group of STAs 55 may be indicated with reference to a TBTT, i.e., by indicating the start time of the contention period as a time offset with respect to the TBTT and indicating the duration of the contention period. Thus, the contention period may have the same periodicity as the TBTT.

In some implementations, the reference time may be the delivery traffic indication message (DTIM) beacon time (e.g., a TBTT at which a Beacon with DTIM indication is expected). The DTIM TBTT may already be known to each STA 55, for example by using mechanisms defined by IEEE specifications such as Association or FMS (Flexible Multicast Service). For each STA 55, or for each group of STAs 55, the indication of the contention period and indications of the related contention parameters may include an identifier for the STA 55 or the group of STAs 55 and the parameters can be indicated in any of the ways described above. Indications for multiple STAs 55 or multiple groups of STAs 55 can be transmitted by the same beacon.

In some implementations, beacons not transmitted at a specific TBTT may include indications for one or more STAs 55 or one or more groups of STAs 55 indicating a time to beacon (e.g., time interval between beacons) with specific information (e.g., a contention period, an AID, etc.) for that STA 55 or that group of STAs 55. The beacons not transmitted at a specific TBTT may precede beacons transmitted at the specific TBTT. In some implementations, the AP 56 may instruct each STA 55 to listen for specific beacons that are transmitted at a specific TBTT or at a specific interval. The time to beacon with specific information may be represented in terms of the beacon interval associated with the STA 55 or the group of STAs 55. In some implementations, time periods (e.g., time periods 41, 42, and 43) during which a group of STAs 55 (e.g., Group 1) is allowed to contend may be interlaced with time periods during which another group of STAs 55 is allowed to contend (e.g., Group 2).

The messages collectively communicate a time period for each group during which the group may contend for the communication channel. In this example, the STAs 55 of Group 1 may contend for the communication channel during time period 43, the STAs 55 of Group 2 may contend for the communication channel during time period 41, the STAs 55 of Group 3 may contend for the communication channel during time period 42, and the STAs 55 of Group 4 may contend for the communication channel during time periods 42 and 43. The STAs 55 are configured to contend for the communication channel during the one or more time periods 44 assigned to the one or more groups to which they each belong.

Figure 6:
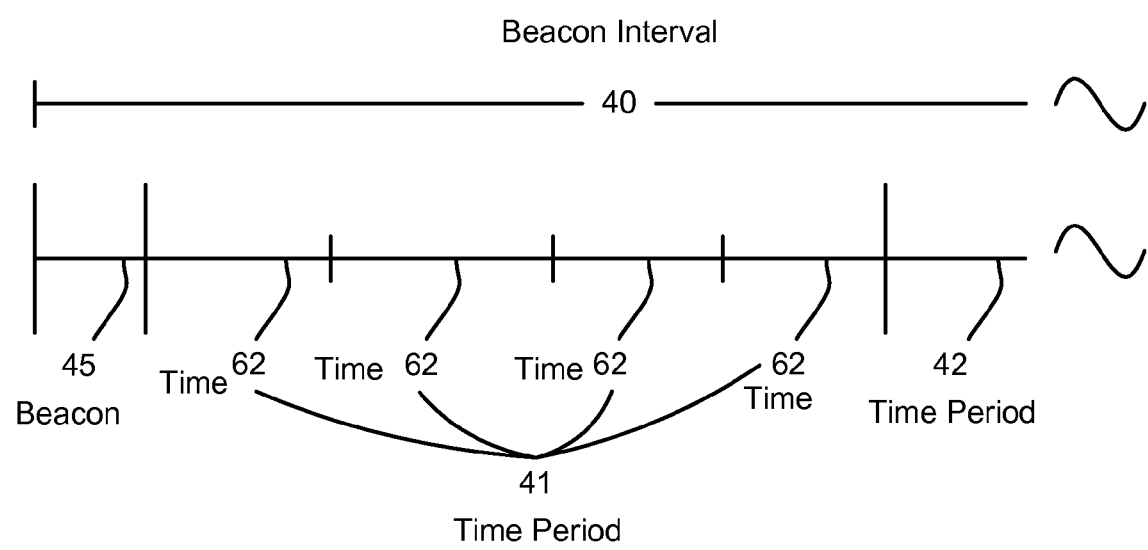
FIG. 6 illustrates an example of a portion of a beacon interval.

In some implementations, the time periods 44 of FIG. 4 may be further divided. FIG. 6 illustrates a portion of beacon interval 40 which includes time period 41. As shown, time period 41 is further divided into a plurality of shorter times 62. As described above, in this example, the STAs 55 of Group 2 may contend for the communication channel during time period 1. The STAs 55 of Group 2 may receive further communications which assign one or more of the shorter times 62 to each of the STAs 55. According to some implementations, at least one STA 55 has at least one time 62 uniquely assigned thereto. The STAs 55 are configured to contend for the communication channel during the times 62 assigned thereto.

Which time 62 each STA 55 is assigned may be determined based on, for example, the identification of each STA 55. For example, the identification of each STA 55 may be hashed to a time slot. In some implementations, the hash changes so that the sequential order of the assignments changes. In some implementations, each STA 55 is assigned a backoff value which determines the time 62 assigned thereto. In some implementations, the unrestricted groups may be further divided into subgroups, and the subgroups may be assigned times 62, for example, according to a method similar to those described herein for assigning times 62 to STAs 55.

In some implementations, the AP 56 may be configured to transmit end of time period messages. Such messages communicate to the STAs 55 transitions from one time period 44 to a next time period 44. In some implementations, the AP 56 transmits end of time period messages at the end of every time period 44. For example, the AP 56 may be configured to determine the duration of each time period 44 based on, for example, the class of traffic of a group unrestricted from contending for the channel during the time period 44. Alternatively, the time periods 44 may all have the same duration. In some implementations, the AP 56 is configured to dynamically determine the length of the time periods 44. For example, because the number of STAs 55 unrestricted from accessing the communication channel during some time periods 44 may be significantly fewer than the total number of STAs 55, there may be time periods 44 during which none of the STAs 55 of the groups unrestricted from contending for the communication channel use the channel. In such situations, the AP 56 may be configured to transmit an end of time period message indicating a transition to the next time period 44.

Figure 7:
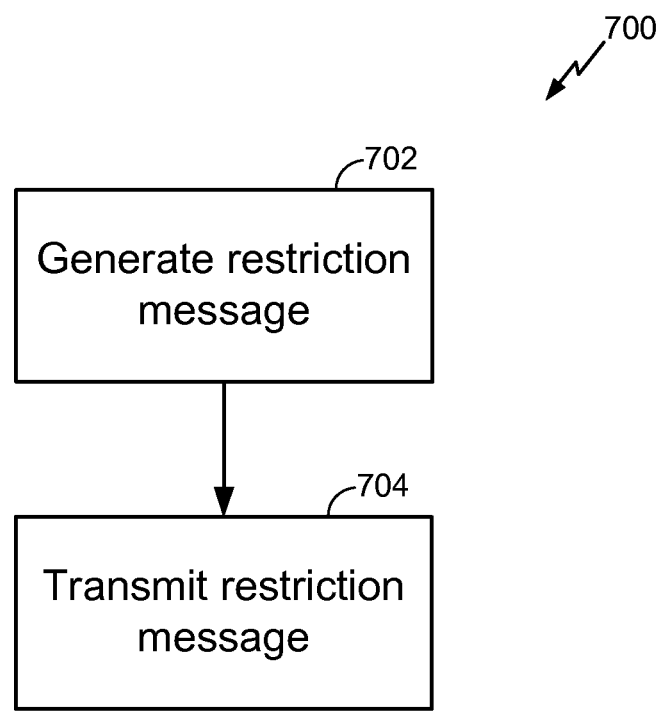
FIG. 7 illustrates an aspect of a method of transmitting a restriction message.

FIG. 7 illustrates an aspect of a method 700 of transmitting a restriction message. The method 700 may, for example, be used by the AP 56 to transmit messages to the STAs 55 to indicate to each of the STAs 55 during which time periods 44 each STA 55 is restricted from contending for the communication channel. The STAs 55 are each in one or more groups of STAs 55, and the method communicates to the STAs 55 of the groups regarding the time periods during which they are restricted from contending for the channel. Although the method 700 is described below with respect to elements of the wireless device 202, those having ordinary skill in the art will appreciate that other components may be used to implement one or more of the steps described herein.

At a block 702 the restriction message is generated. The restriction message identifies a time period during which each station of one or more particular groups is restricted from contending for the communication channel. At block 704 the restriction message is transmitted to the stations of the particular groups. In some implementations, the restriction message is transmitted as part of a beacon. In some implementations, the time period assignments repeat each beacon interval. Alternatively, the time period assignments may be independent of beacon intervals and may individually or collectively overlap beacon interval boundaries.

In some implementations, the method of FIG. 7 is repeated so that a plurality of restriction messages are generated and transmitted. The messages collectively communicate to the stations unrestricted time periods, during which they may contend for the communication channel and restricted time periods, during which they may not contend for the communication channel. In some implementations, the messages are included in a beacon.

Each STA 55 has a unique identification, and in some implementations, the STAs 55 are configured to determine which one or more groups they are members of, and therefore during which time period they are permitted to contend for the channel based on the identifications. In some implementations, the STAs 55 use their identification along with a reference time, received, for example, in a beacon, to determine the one or more groups to which they belong.

Each STA 55 may have or be associated with a class of traffic which they intend to transmit. In some implementations, the STAs 55 are configured to determine which one or more groups they are members of based on their class of traffic.

In some implementations, the restriction messages collectively identify a time within a time period for one or more of the STAs 55 to contend for the communication channel or to have access to the communication channel exclusive of other STAs 55, for example, exclusive of other STAs 55 from the groups unrestricted from contending for the channel during the time period.

In some implementations, the messages include one or more parameters which are used by the STAs 55 to determine how to contend for the channel. For example, the parameters may include a backoff for each STA 55, which may be used by the STA 55 to determine a time when to contend for the channel. For example, the each STA 55 may use its backoff and a reference time to calculate a time when to contend for the channel. For example, the parameters may include a time for each STA 55, which may be used by the STA 55 to start contention on the channel. For example, the parameters may include a quality of service (QoS) indication for the STA 55, which may indicate to the STA 55 which QoS traffic class can be sent during the contention period. In another example, the STA 55 may select a random (e.g., uniformly distributed) time within the contention period to start the contention.

In some implementations, the AP 56 is configured to determine the duration or the end of the time periods. The AP 56 is, accordingly, configured to send messages to the STAs 55 to communicate the times for transitions from one time period to another. In some implementations, the AP 56 determines the end of a time period based on a duration of time during which the channel is not being used by the STAs 55 which are unrestricted from contending for the channel.

In some implementations, the AP 56 is configured to send an acknowledgement message to the STAs 55 from which the AP 56 had received communications. Each acknowledgement message to the STAs 55 may serve to acknowledge communications from one or more STAs 55.

In some implementations, the AP 56 may send a medium reservation message (e.g. a clear-to-send-to-self (CTS-to-Self)) before or during the period of time when the STAs 55 of a given group are allowed to contend. In some IEEE 802.11 specifications, a CTS-to-Self forbids access to the medium by all STAs 55 except for the one STA 55 that sent the CTS-to-Self. In the implementations described herein, the STAs 55 (that which it has already been indicated that contention is allowed) can disregard the CTS-to-Self and may contend on the medium. The purpose of the CTS-to-Self may be to prevent access to the medium by STAs that may not be aware that the time was reserved for a specific group (e.g., STAs from an overlapping access point or base station subsystem). The CTS-to-self may also indicate the group of STAs 55 that is to honor or disregard the CTS-to-self. The group of STAs 55 may be indicated in terms of QoS class, transmit power, station type, group ID, or a combination thereof. The AP 56 may send a contention-free end beacon (CF-End) frame as soon as the AP 56 infers that no STAs 55 have been instructed to access the medium in the interval of time reserved for one or more groups. The CF-End frame may indicate that the medium is not reserved anymore for any groups, and thus any STA 55 can access the medium. Alternatively, the CF-end may indicate that the medium is no longer reserved for some of the groups allocated to a given interval.

In some implementations, a STA 55 in a group may send a medium reservation message (e.g., a request to send (RTS)) any time to request for a period of time where STAs 55 of the same group are permitted to contend. In some implementations, the AP 56 may grant the period of time by sending a clear medium reservation message (e.g., a clear to send (CTS)). The RTS and CTS messages may indicate to the group of STAs 55 that the group is permitted to contend for the medium after this message exchange. This implementation may be useful for event-driven uplink transmissions where a group of STAs need an on-demand access of the medium.

Figure 8:
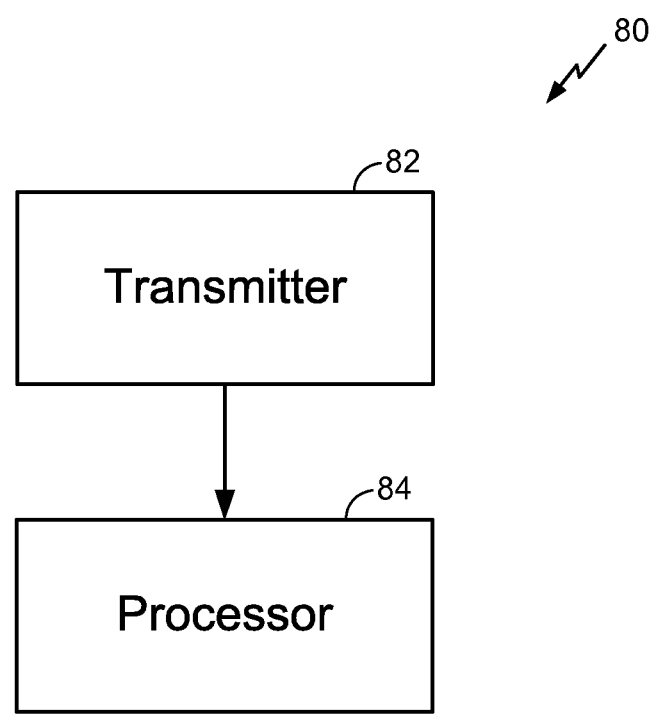
FIG. 8 is a block diagram of an exemplary wireless device.

FIG. 8 is a block diagram of an exemplary wireless device 80 which may be employed within the wireless communication system 50. The device 80 comprises a transmitter 82 in communication with a processor 84. The transmitter 82 may be configured to perform one or more of the functions described above with respect to the block 704 of FIG. 7. The transmitter 82 may correspond to the transmitter 210 of FIG. 2. The processor 84 may be configured to perform one or more of the functions described above with respect to the block 702 of FIG. 7. The processor 84 may correspond to one or more of the processor 204, the memory 206, the signal detector 218, and the DSP 220 of FIG. 2.

Figure 9:
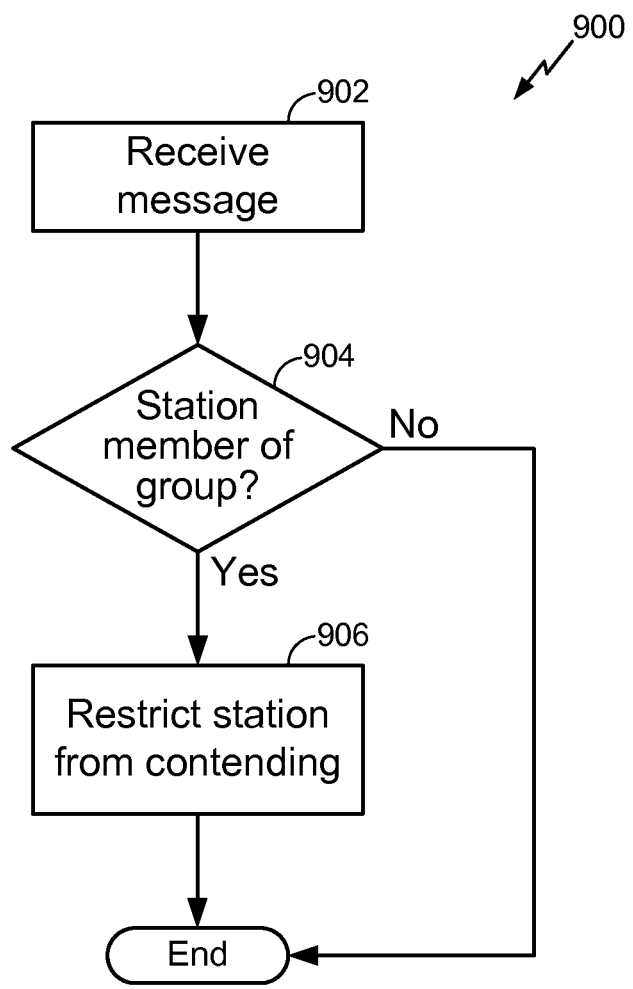
FIG. 9 illustrates an aspect of a method of receiving a restriction message.

FIG. 9 illustrates an aspect of a method 90 of receiving a restriction message. The method 900 may, for example, be used by a STA 55 to receive messages from the AP 56 to determine during which time periods 44 the STA 55 is restricted from contending for the communication channel. The STAs 55 are each in one or more groups of STAs 55, and the method communicates to the STAs 55 of the groups regarding the time periods during which they are restricted from contending for the channel. Although the method 900 is described below with respect to elements of the wireless device 202, those having ordinary skill in the art will appreciate that other components may be used to implement one or more of the steps described herein.

At block 902 a restriction message is received. The restriction message indicates one or more time periods during which one or more groups of STAs 55 are restricted from accessing the communication channel. The restriction message may have characteristics similar to those described above.

In this example, the STA 55, at block 904 determines whether the STA 55 is a member of a group indicated by the restriction message as being restricted from accessing the communication channel during one or more time periods. If the STA 55 is not a member of such a group, the method ends. If, on the other hand, the STA 55 is a member of such a group, the STA 55 is configured to not contend for the communication channel during the time periods indicated in the restriction message.

In some implementations, the method of FIG. 9 is repeated so that a plurality of restriction messages are received. The received messages collectively communicate to the STA 55 unrestricted time periods, during which the STA 55 may contend for the communication channel and restricted time periods, during which the STA 55 may not contend for the communication channel. As an example, the STA 55 of a given group may exclusively contend on the medium during a given time period after the beacon. For example, the group may include the STAs 55 that have limited hardware capabilities, such as low transmit power or use a battery power source, or the group may include STAs 55 that have a given type of traffic, such as emergency traffic or sensor traffic. In another example, the AP 56 may be the only member of a group and the group may have exclusive access to the medium during a given interval of time. The AP 56 being the only member of a group may be useful for delivering downlink data to the STAs 55. In another example, a single STA 55 may be the only member of a group.

The STA 55 may also send a request to a coordinator (e.g., the AP 56) to assign the STA 55 to a particular group or that a new group is requested to be created. The STA 55 may also indicate the requested characteristics of the group, the requested characteristic of the contention period, and/or the contention parameters for the contention period in any of the options described herein. The STA 55 may also indicate the desirable time intervals for uplink contention, their duration, and periodicity. The request may be included in a probe request, association/reassociation request message or in a management frame sent after association. The coordinator may grant the request, deny the request, or suggest different values for the group. The coordinator may also suggest different values for the interval of time and the contention parameters. The response from the coordinator may be included in a probe response association/reassociation response message or in a management frame that is responsive to the request received from the STA 55.

A STA 55 may also indicate at association/reassociation whether the coordinator is allowed to group the STA 55 in certain groups, whether the coordinator can define contention periods with certain characteristics, and/or contention parameters with certain characteristics for the STA 55. For example, a STA 55 dedicated to emergency signaling may declare that it cannot be included in any group that is not allowed to access the medium less often than a given frequency. As another example, a STA 55 with a limited power budget may indicate it cannot be included in a group with more than a given number of other contending STAs 55 or within a group that is only allowed to access the medium with low priority.

Figure 10:
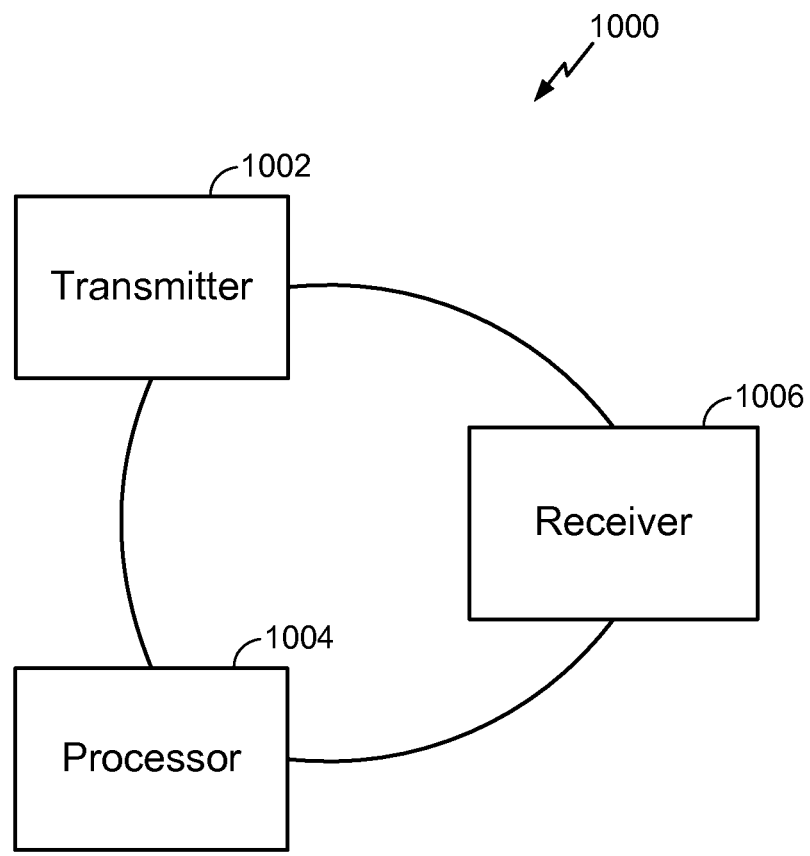
FIG. 10 is a block diagram of an exemplary wireless device.

FIG. 10 is a block diagram of an exemplary wireless device 1000 which may be employed within the wireless communication system 50. The device 1000 comprises a transmitter 1002, a processor 1004, and a receiver 1006. The transmitter 1002 is in communication with the processor 1004 and the receiver 1006, and the processor 1004 is also in communication with the receiver 1006. The transmitter 1002 may be configured to conditionally contend for a communication channel, as described above. The transmitter 1002 may correspond to the transmitter 210 of FIG. 2. The processor 1004 may be configured to perform one or more of the functions described above with respect to the blocks of 904 and 906 of FIG. 9. The processor 1004 may correspond to one or more of the processor 204, the memory 206, the signal detector 218, and the DSP 220 of FIG. 2. The receiver 1006 may be configured to perform one or more of the functions described above with respect to the block 902 of FIG. 9. The receiver 1006 may correspond to the receiver 212 of FIG. 2.

In a particular embodiment, an apparatus may include means for wirelessly communicating with one or more stations that are partitioned into one or more groups. For example, the means for wirelessly communicating may include one or more components (e.g., a transmitter) of the AP 104 of FIG. 1, the transmitter 210 and the antenna 216 of FIG. 2, one or more components (e.g., a transmitter) of the AP 56 of FIG. 5, the transmitter 1002 of FIG. 10, one or more other devices configured to wirelessly transmit data, or any combination thereof. The apparatus may also include means for generating a message that identifies one or more time periods during which each station of a first group of the one or more groups is permitted to contend for a communication channel or restricted from contending for the communication channel. The means for generating may include one or more components (e.g., a processor) of the AP 104 of FIG. 1, the processor 204, one or more components (e.g., a processor) of the AP 56 of FIG. 5, the processor 1004, one or more other devices configured to generate data, or any combination thereof.

The apparatus may further include means for instructing the means for wirelessly communicating to transmit the first message. The means for instructing may include one or more components (e.g., a processor) of the AP 104 of FIG. 1, the processor 204 of FIG. 2, one or more components (e.g., a processor) of the AP 56 of FIG. 5, the processor 1004 of the wireless device 1000 of FIG. 10, one or more other devices configured to instruct the means for wirelessly communicating, or any combination thereof.

In another particular embodiment, an apparatus may include means for wirelessly communicating with one or more stations. The means for wirelessly communicating may include one or more components (e.g., a transmitter) of the STA 106 of FIG. 1, the transmitter 210 and the antenna 216 of FIG. 2, one or more components (e.g., a transmitter) of the STA 55 of FIG. 5, the transmitter 1002 of FIG. 10, one or more other devices configured to wirelessly communicate to one or more stations, or any combination thereof. The apparatus may also include means for receiving a message that identifies one or more time periods during which each station of a first group of stations is permitted to contend for a communication channel or restricted from contending for the communication channel. The means for receiving may include one or more components (e.g., a receiver) of the STA 106 of FIG. 1, the receiver 212 and the antenna 216 of FIG. 2, one or more components (e.g., a receiver) of the STA 55 of FIG. 5, the receiver 1006 of FIG. 10, one or more other devices configured to receive data, or any combination thereof.

The apparatus may further include means for determining whether the means for wirelessly communicating is permitted to contend for the communication channel or restricted from contending for the communication channel during the one or more time periods based on whether the device is a member of the first group. The means for determining may include one or more components (e.g., a processor) of the STA 106 of FIG. 1, the processor 204 of FIG. 2, one or more components (e.g., a processor) of the STA 55 of FIG. 5, the processor 1004 of FIG. 10, one or more other devices configured to make determinations, or any combination thereof.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like. Further, a "channel width" as used herein may encompass or may also be referred to as a bandwidth in certain aspects.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

In one or more aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Thus, in some aspects computer readable medium may comprise non-transitory computer readable medium (e.g., tangible media). In addition, in some aspects computer readable medium may comprise transitory computer readable medium (e.g., a signal). Combinations of the above should also be included within the scope of computer-readable media.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

What is claimed is:

1. A method, comprising:
   contending, by a device having a transmitter, for a communication channel;

receiving a message that identifies one or more time periods during which each station of a first group of stations is permitted to contend for the communication channel or restricted from contending for the communication channel;

receiving a plurality of messages directed to a plurality of stations, wherein the plurality of messages collectively communicate a plurality of time periods during which the first group is permitted to contend for the communication channel or restricted from contending for the communication channel and during which a second group of stations is permitted to contend for the communication channel or restricted from contending for the communication channel, and wherein each station of the first group and each station of the second group are permitted to contend for the communication channel during at least one time period; and determining whether to permit contending for the communication channel or to be restricted from contending for the communication channel during said one or more time periods based on whether the device is a member of the first group; and determining, based on the plurality of messages:

restricted time periods during which the transmitter is restricted from contending for the communication channel; and unrestricted time periods during which the transmitter is permitted to contend for the communication channel.

2. The method of claim 1, wherein the message that identifies said one or more time periods during which each station of the first group of stations is permitted to contend for the communication channel or restricted from contending for the communication channel is included in a beacon.

3. The method of claim 2, further comprising receiving a second message from an access point, wherein the second message identifies the beacon.

4. The method of claim 3, wherein the second message is included in a second beacon that precedes the beacon.

5. The method of claim 1, wherein said one or more time periods include a time interval that is longer than one beacon period.

6. The method of claim 1, wherein the plurality of messages are included in a beacon.

7. The method of claim 1, wherein the device has a corresponding unique identifier, and wherein the message identifies a particular unique identifier corresponding to each station of the first group, further comprising determining said one or more time periods based on the corresponding unique identifier of the device.

8. The method of claim 1, wherein the device has an associated class of traffic, and wherein the message identifies a particular traffic class, further comprising determining said one or more time periods based on the associated class of traffic of the device.

9. The method of claim 1, wherein the device has a corresponding unique identifier, further comprising determining said one or more time periods based on the corresponding unique identifier of the device and based on a reference time.

10. The method of claim 1, wherein the plurality of messages identify times within a time period during which each station of the plurality of stations is permitted to contend for the communication channel, further comprising:

determining, based on the plurality of messages, a particular interval for the device to contend for the communication channel; and selectively instructing the transmitter to contend for the communication channel during the particular interval.

11. The method of claim 1, wherein the plurality of messages identify times within a time period during which each station of the plurality of stations is permitted to have access to the communication channel, further comprising:

determining, based on the plurality of messages, a particular interval for the device to access the communication channel; and selectively instructing the transmitter to access the communication channel during the particular interval.

12. The method of claim 1, wherein the message that identifies said one or more time periods during which each station of the first group of stations is permitted to contend for the communication channel or restricted from contending for the communication channel further provides one or more parameters to the first group, and wherein said one or more parameters control how the first group contends for the communication channel when not restricted from contending, further comprising selectively instructing the transmitter to contend for the communication channel according to said one or more parameters.

13. The method of claim 12, wherein said one or more parameters indicate an initial value for a backoff period for each station of the first group.

14. The method of claim 1, further comprising:

receiving a second message that communicates an end time of said one or more time periods; and instructing the transmitter to discontinue contention for the communication channel after the end time.

15. The method of claim 1, further comprising determining whether a transmission to a station is successfully received by the station based on a message received from the station acknowledging the transmission.

16. The method of claim 1, wherein the first group includes a single station.

17. A device, comprising:

a transceiver configured to:

contend for a communication channel;

receive a message that identifies one or more time periods during which each station of a first group of stations is permitted to contend for the communication channel or restricted from contending for the communication channel;

receive a plurality of messages directed to a plurality of stations, wherein the plurality of messages collectively communicate a plurality of time periods during which the first group is permitted to contend for the communication channel or restricted from contending for the communication channel and during which a second group of stations is permitted to contend for the communication channel or restricted from contending for the communication channel, and wherein each station of the first group and each station of the second group are permitted to contend for the communication channel during at least one time period; and at least one processor configured to:

determine whether to permit contending for the communication channel or to be restricted from contending for the communication channel during said one or more time periods based on whether the device is a member of the first group; and determine, based on the plurality of messages:
  restricted time periods during which the device is restricted from contending for the communication channel; and
  unrestricted time periods during which the device is permitted to contend for the communication channel.

18. The device of claim 17, wherein the message that identifies said one or more time periods during which each station of the first group of stations is permitted to contend for the communication channel or restricted from contending for the communication channel is included in a beacon.

19. The device of claim 18, wherein the transceiver is further configured to receive a second message from an access point, wherein the second message identifies the beacon.

20. The device of claim 19, wherein the second message is included in a second beacon that precedes the beacon.

21. The device of claim 17, wherein said one or more time periods include a time interval that is longer than one beacon period.

22. The device of claim 17, wherein the plurality of messages are included in a beacon.

23. The device of claim 17, wherein the device has a corresponding unique identifier, wherein the message identifies a particular unique identifier corresponding to each station of the first group, and wherein the at least one processor is further configured to determine said one or more time periods based on the corresponding unique identifier of the device.

24. The device of claim 17, wherein the device has an associated class of traffic, and wherein the at least one processor is further configured to determine said one or more time periods based on the associated class of traffic of the device.

25. The device of claim 17, wherein the device has a corresponding unique identifier, and wherein the at least one processor is further configured to determine said one or more time periods based on the corresponding unique identifier of the device and based on a reference time.

26. The device of claim 17, wherein the plurality of messages identify times within a time period during which each station of the plurality of stations is permitted to contend for the communication channel, wherein the at least one processor is further configured to:
  determine, based on the plurality of messages, a particular interval for the device to contend for the communication channel; and
  selectively instruct the device to contend for the communication channel during the particular interval.

27. The device of claim 17, wherein the plurality of messages identify times within a time period during which each station of the plurality of stations is permitted to have access to the communication channel, wherein the at least one processor is further configured to:
  determine, based on the plurality of messages, a particular interval for the device to access the communication channel; and
  selectively instruct the device to access the communication channel during the particular interval.

28. The device of claim 17, wherein the message that identifies said one or more time periods during which each station of the first group of stations is permitted to contend for the communication channel or restricted from contending for the communication channel further provides one or more parameters to the first group, wherein said one or more parameters control how the first group contends for the communication channel when not restricted from contending, and wherein the at least one processor is further configured to selectively instruct the device to contend for the communication channel according to said one or more parameters.

29. The device of claim 28, wherein said one or more parameters indicate an initial value for a backoff period for each station of the first group.

30. The device of claim 17, wherein:
  the transceiver is further configured to receive a second message that communicates an end time of said one or more time periods; and
  the at least one processor is further configured to instruct the device to discontinue contention for the communication channel after the end time.

31. The device of claim 17, wherein the at least one processor is further configured to determine whether a transmission to a station is successfully received by the station based on a message received from the station acknowledging the transmission.

32. The device of claim 17, wherein the first group includes a single station.

33. A non-transitory computer readable medium comprising instructions that are executable to:
  contend for a communication channel;
  receive a message that identifies one or more time periods during which each station of a first group of stations is permitted to contend for the communication channel or restricted from contending for the communication channel;
  receive a plurality of messages directed to a plurality of stations,
    wherein the plurality of messages collectively communicate a plurality of time periods during which the first group is permitted to contend for the communication channel or restricted from contending for the communication channel and during which a second group of stations is permitted to contend for the communication channel or restricted from contending for the communication channel, and
    wherein each station of the first group and each station of the second group are permitted to contend for the communication channel during at least one time period; and
  determine whether to permit contending for the communication channel or to be restricted from contending for the communication channel during said one or more time periods based on whether a device that includes the non-transitory computer readable medium is a member of the first group; and
  determine, based on the plurality of messages:
    restricted time periods during which the device is restricted from contending for the communication channel; and
    unrestricted time periods during which the device is permitted to contend for the communication channel.

34. The non-transitory computer readable medium of claim 33, wherein the message that identifies said one or more time periods during which each station of the first group of stations is permitted to contend for the communication channel or restricted from contending for the communication channel is included in a beacon.

35. The non-transitory computer readable medium of claim 34, further comprising instructions to receive a second message from an access point, wherein the second message identifies the beacon.

36. The non-transitory computer readable medium of claim 35, wherein the second message is included in a second beacon that precedes the beacon.

37. The non-transitory computer readable medium of claim 33, wherein said one or more time periods include a time interval that is longer than one beacon period.

38. The non-transitory computer readable medium of claim 33, wherein the plurality of messages are included in a beacon.

39. The non-transitory computer readable medium of claim 33, wherein the device has a corresponding unique identifier, and wherein the message identifies a particular unique identifier corresponding to each station of the first group, further comprising instructions to determine said one or more time periods based on the corresponding unique identifier of the device.

40. The non-transitory computer readable medium of claim 33, wherein the device has an associated class of traffic, and wherein the message identifies a particular traffic class, further comprising instructions to determine said one or more time periods based on the associated class of traffic of the device.

41. The non-transitory computer readable medium of claim 33, wherein the device has a corresponding unique identifier, further comprising instructions to determine said one or more time periods based on the corresponding unique identifier of the device and based on a reference time.

42. The non-transitory computer readable medium of claim 33, wherein the plurality of messages identify times within a time period during which each station of the plurality of stations is permitted to contend for the communication channel, further comprising instructions to:
determine, based on the plurality of messages, a particular interval for the device to contend for the communication channel; and
selectively instruct the device to contend for the communication channel during the particular interval.

43. The non-transitory computer readable medium of claim 33, wherein the plurality of messages identify times within a time period during which each station of the plurality of stations is permitted to have access to the communication channel, further comprising instructions to:
determine, based on the plurality of messages, a particular interval for the device to access the communication channel; and
selectively instruct the device to access the communication channel during the particular interval.

44. The non-transitory computer readable medium of claim 33, wherein the message that identifies said one or more time periods during which each station of the first group of stations is permitted to contend for the communication channel or restricted from contending for the communication channel further provides one or more parameters to the first group, and wherein said one or more parameters control how the first group contends for the communication channel when not restricted from contending, further comprising instructions to selectively instruct the device to contend for the communication channel according to said one or more parameters.

45. The non-transitory computer readable medium of claim 44, wherein said one or more parameters indicate an initial value for a backoff period for each station of the first group.

46. The non-transitory computer readable medium of claim 33, further comprising instructions to:
receive a second message that communicates an end time of said one or more time periods; and
instruct the device to discontinue contention for the communication channel after the end time.

47. The non-transitory computer readable medium of claim 33, further comprising instructions to determine whether a transmission to a station is successfully received by the station based on a message received from the station acknowledging the transmission.

48. The non-transitory computer readable medium of claim 33, wherein the first group includes a single station.

* * * * *